US007236875B2

(12) United States Patent
Bevan et al.

(10) Patent No.: US 7,236,875 B2
(45) Date of Patent: Jun. 26, 2007

(54) SYSTEM AND METHOD FOR CONTROLLING AN ENGINE IN A VEHICLE

(75) Inventors: David Bevan, Northville, MI (US); David Liller, Westland, MI (US); Douglas Martin, Canton, MI (US); John Shanahan, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 10/907,298

(22) Filed: Mar. 28, 2005

(65) Prior Publication Data

US 2006/0213185 A1   Sep. 28, 2006

(51) Int. Cl.
*G01F 17/00* (2006.01)
*F02D 43/00* (2006.01)

(52) U.S. Cl. .................................... 701/113
(58) Field of Classification Search ............ 701/113, 701/101, 102, 108, 109, 115; 123/406.45, 123/362, 399, 361; 477/111
See application file for complete search history.

(56) References Cited

U.S. PATENT DOCUMENTS 3,672,048 A * 6/1972 Conwell ................ 122/279

| 4,133,325 | A |   | 1/1979 | West ................ 123/406.59 |
| 4,463,801 | A | * | 8/1984 | Yoshimi et al. ............ 165/202 |
| 5,893,349 | A |   | 4/1999 | Rado ................ 123/179.16 |
| 6,293,262 | B1 | * | 9/2001 | Craig et al. ............... 123/542 |
| 2002/0145053 | A1 |   | 10/2002 | Kuenstler et al. ........... 237/2 A |
| 2003/0101961 | A1 |   | 6/2003 | Foster .................... 123/198 F |

FOREIGN PATENT DOCUMENTS

| DE | 38 01910 A1 | * | 8/1988 |
| EP | 1048835 B1 |   | 9/2003 |
| WO | WO03/048548 A1 |   | 6/2003 |

\* cited by examiner

*Primary Examiner*—Hieu T. Vo
(74) *Attorney, Agent, or Firm*—David B. Kelley; Brooks Kushman P.C.

(57) ABSTRACT

A system and method for controlling an engine in a vehicle to facilitate heat transfer to a passenger compartment is provided. A number of conditions are examined, and if it is found that one or more of these conditions matches a corresponding predetermined condition, the spark timing of the engine is retarded. In addition, a charge motion control valve is opened, thereby increasing the amount, and reducing the turbulence, of the air entering the engine. This facilitates hotter combustion within the engine, and therefore faster heat transfer to the vehicle passenger compartment.

21 Claims, 2 Drawing Sheets

SYSTEM AND METHOD FOR CONTROLLING AN ENGINE IN A VEHICLE

BACKGROUND OF THE INVENTION

1. Field of the Invention

The present invention relates to a system and method for controlling an engine in a vehicle.

2. Background Art

The development of hybrid electric vehicles (HEV's) has provided a way to reduce exhaust emissions and improve fuel economy by reducing the amount of time an engine is running. In addition, because HEV's are equipped with electric motors, the size of the engine can be reduced. Even in some conventional vehicles, engines may be smaller today than in comparable predecessor vehicles, since advances in engine technology have provided increases in engine output power.

One consequence of having a smaller engine in a vehicle is that it may take longer for the vehicle passenger compartment to get warm. This can affect passenger comfort and convenience, in that it may also take longer for a windshield to defrost. One attempt to address this issue is described in U.S. Patent Application Publication No. 2003/0101961, published on Jun. 5, 2003 (Foster). Foster describes deactivating cylinders in an engine to increase the heat rejected to the engine cooling system. Foster also discusses reducing the cooling system heat capacity such that the engine coolant that flows through the passenger compartment heating system only flows through the engine past activated cylinders.

One limitation of the method described in Foster, is that it does not take advantage of selective use of a charge motion control valve. These valves are used on some engines to increase the turbulence of the intake air entering the engine, thereby increasing the efficiency of combustion. When a charge motion control valve is opened, the amount of intake air entering the engine is increased; this is normally associated with cooler combustion. The opening of a charge motion control valve also decreases the turbulence of the intake air entering the engine, however, which can counter the effects of the increased amount of air, and lead to an increase in the combustion temperature. This, in turn, can help to more quickly heat the passenger compartment.

Another situation that can undesirably increase the time it takes to heat a passenger compartment is execution of a control logic configured to quickly heat a catalyst after the engine is started. Such a control logic may be used to reduce undesirable exhaust emissions, but may have the unintended effect of making less heat available to the passenger compartment. One method that has been used to quickly heat a catalyst is to severely retard the spark timing in a spark ignition engine. This causes unburned fuel that is exhausted from the engine to be combusted at or near the catalyst itself. Although this provides a method for quickly heating the catalyst, it reduces the amount of heat that can be transferred to an engine coolant, and ultimately transferred to the vehicle passenger compartment. Therefore, merely retarding spark timing, and in particular retarding it past top dead center (TDC), can be at odds with quickly heating a vehicle passenger compartment.

Therefore, a need exists for a system and method to utilize various vehicle adjustments to facilitate a more rapid heat transfer from the engine to the vehicle passenger compartment.

SUMMARY OF THE INVENTION

One advantage of the present invention is that it provides a method and system for controlling an engine parameter, such as spark timing, to facilitate a faster rate of heat transfer from the engine to the vehicle passenger compartment.

Another advantage of the present invention is that it provides a method and system that can selectively utilize a charge motion control valve to increase the temperature of combustion within the engine, thereby more quickly heating the passenger compartment.

The invention also provides a method for controlling an engine in a vehicle to facilitate heat transfer to a passenger compartment in the vehicle. The engine includes a valve for controlling the motion of intake air entering the engine. The method includes setting at least one engine parameter to effect an increase in a rate of temperature increase of the engine when at least one predetermined condition is met. This facilitates an increase in the rate of heat transfer from the engine to the passenger compartment. The valve is at least partially opened when the at least one predetermined condition is met. This inhibits turbulence and increases the amount of intake air entering the engine.

The invention further provides a method for controlling an engine in a vehicle to facilitate heat transfer to a passenger compartment in the vehicle. The engine includes a valve for controlling the motion of intake air entering the engine. The method includes retarding a spark timing of the engine when at least one predetermined condition is met. The at least one predetermined condition includes at least one vehicle condition. The valve is at least partially opened when the at least one predetermined condition is met. This inhibits turbulence and increases the amount of intake air entering the engine.

The invention also includes a system for controlling an engine in a vehicle to facilitate heat transfer to a passenger compartment in the vehicle. The system includes a valve for controlling the motion of intake air entering the engine. The valve has a closed position for effecting turbulence in the intake air entering the engine. In the closed position, the valve also restricts the flow of the intake air entering the engine. The valve also has at least one open position for inhibiting turbulence in, and reducing the restriction of the flow of, the intake air entering the engine. A control system includes at least one controller. The control system is configured to determine when at least one predetermined condition is met. The control system is also configured to set at least one engine parameter to effect an increase in a rate of temperature increase of the engine when the at least one predetermined condition is met. This facilitates an increase in the rate of heat transfer from the engine to the passenger compartment. The control system is also configured to move the valve from the closed position to one of the at least one open positions when the at least one predetermined condition is met.

DETAILED DESCRIPTION OF THE PREFERRED EMBODIMENT(S)

Figure 1:
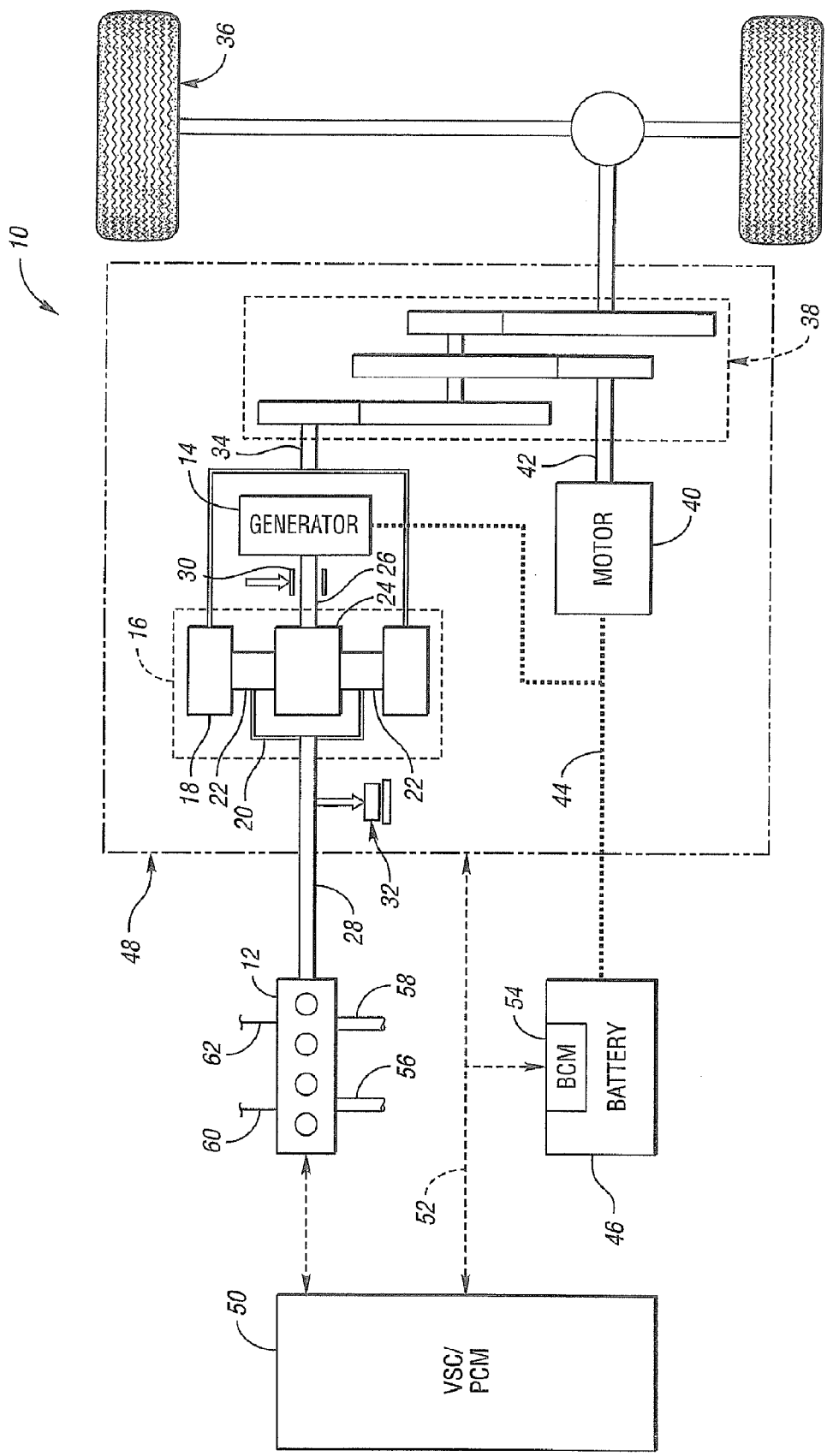
FIG. 1 is a schematic representation of an exemplary vehicle powertrain system in accordance with the present invention.

FIG. 1 shows a schematic representation of a vehicle 10 in accordance with one embodiment of the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. The transaxle 48 is analogous to a transmission in a conventional vehicle. Thus, when a driver selects a particular gear, the transaxle 48 is appropriately controlled to provide that gear. To control the engine 12 and the components of the transaxle 48—e.g., the generator 14 and motor 40—a control system, including a controller 50, is provided. As shown in FIG. 1, the controller 50 is a combination vehicle system controller and powertrain control module (VSC/PCM). Although it is shown as a single hardware device, it may include multiple controllers in the form of multiple hardware devices, or multiple software controllers within one or more hardware devices.

A controller area network (CAN) 52 allows the VSC/PCM 50 to communicate with the transaxle 48 and a battery control mode (BCM) 54. Just as the battery 46 has the BCM 54, other devices controlled by the VSC/PCM 50 may have their own controllers. For example, an engine control unit (ECU) may communicate with the VSC/PCM 50 and may perform control functions on the engine 12. In addition, the transaxle 48 may include one or more controllers, such as a transaxle control module (TCM), configured to control specific components within the transaxle 48, such as the generator 14 and/or the motor 40. Some or all of these controllers may be a part of a control system for the present invention.

FIG. 1 also shows an air intake pipe 56 and an exhaust pipe 58 respectively providing a fluid pathway to and from the engine 12. In addition, coolant lines 60, 62 are also shown leading into and out of the engine 12. The pipes 56, 58 and the coolant lines 60, 62 are shown in greater detail in FIG. 2. Although the vehicle 10, shown in FIG. 1, is an HEV, it is understood that the present invention contemplates the use of other types of vehicles, including conventional "engine-only" vehicles. In addition, although the vehicle 10 shown in FIG. 1 is a parallel-series HEV, the present invention is not limited to HEV's having such a "powersplit" configuration.

Figure 2:
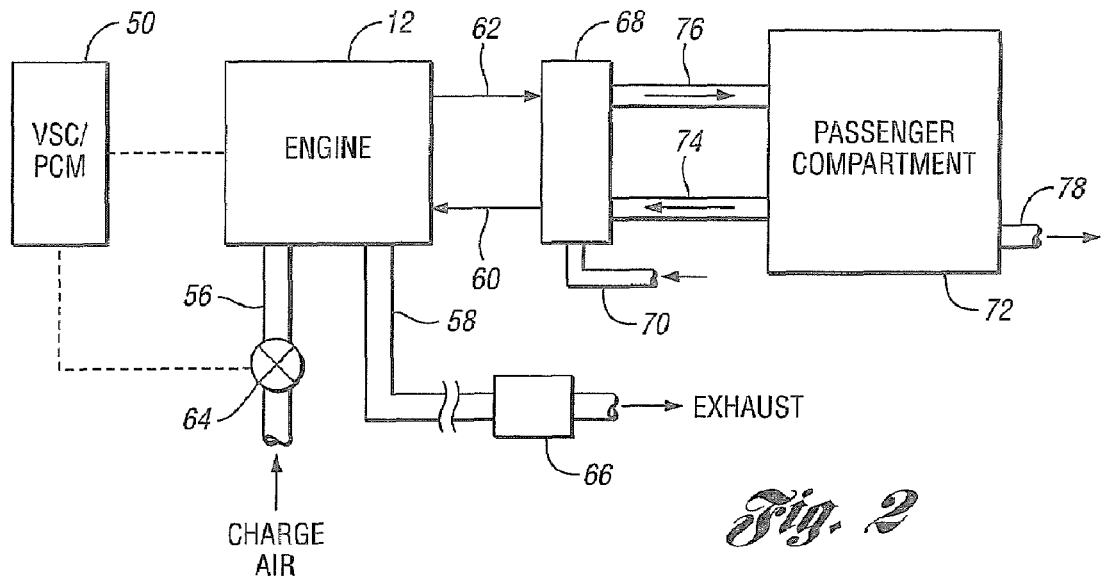
FIG. 2 is a schematic representation of a portion of the vehicle and associated control system shown in FIG. 1.

As shown in FIG. 2, the intake air pipe 56 receives charge air which, for the vehicle 10 shown in FIG. 1, is ambient air from outside the vehicle 10. For other types of vehicles, the charge air may be compressed prior to entering the engine 12, for example, in the case of a turbo charged engine. In addition, some configurations may include exhaust gas that is recirculated back into the engine and combined with fresh air which may or may not be compressed. Prior to entering the engine cylinders, the charged air goes through a charge motion control valve 64. The charge motion control valve 64, shown in FIG. 2, has only two positions: "open" and "closed". Of course, other charge motion control valves may have multiple positions between a fully open and fully closed position.

The charge motion control valve 64 allows some of the charge air to enter the engine 12 even when it is in its closed position. In addition to restricting the flow of the charge air entering the engine 12, the charge motion control valve 64 in its closed position controls the motion of the charge air entering the engine 12. In particular, the charge motion control valve 64 causes the charge air entering the engine 12 to experience very turbulent flow. This causes the charge air entering the engine 12 to be more efficiently mixed with the fuel that is injected into the engine 12, thereby creating more efficient combustion. When the charge motion control valve 64 is open, the restriction of the air flow into the engine 12 is reduced, as is the turbulence of the flow. As explained more fully below, the VSC/PCM 50 controls operation of the charge motion control valve 64 as part of a method of the present invention.

The vehicle 10 also includes a catalytic converter, or catalyst 66, which receives exhaust gas from the engine 12, and facilitates reactions within the exhaust gas to reduce emissions introduced into the atmosphere. In order for the catalyst 66 to effectively create the reactions within the exhaust gas to reduce emissions, it is desired to have the catalyst 66 quickly reach its activation, or light-off temperature. As noted above, implementing a control system to supply engine heat to a catalyst, such as the catalyst 66, may reduce the amount of heat available to warm a vehicle passenger compartment and/or defrost a windshield. As discussed below, the present invention addresses these two concerns to the satisfaction of both.

As shown in FIG. 2, the coolant line 62 leads from the engine 12 into a heat exchanger 68. Conversely, the coolant line 60 facilitates coolant flow from the heat exchanger 68 back into the engine 12. The heat exchanger 68 also receives air, which can be fresh air entering through a duct 70, or recirculated air which comes from a passenger compartment 72 through a duct 74. The air entering the heat exchanger 68 receives heat from the engine coolant, and supplies it back to the passenger compartment 72 through a duct 76. It is understood that the schematic representation shown in FIG. 2 represents a simplified version of an actual heat exchanger and duct system. Finally, if the air from the passenger compartment is not recirculated through the duct 74, it can be exhausted back to the ambient air outside the vehicle through a duct 78.

Figure 3:
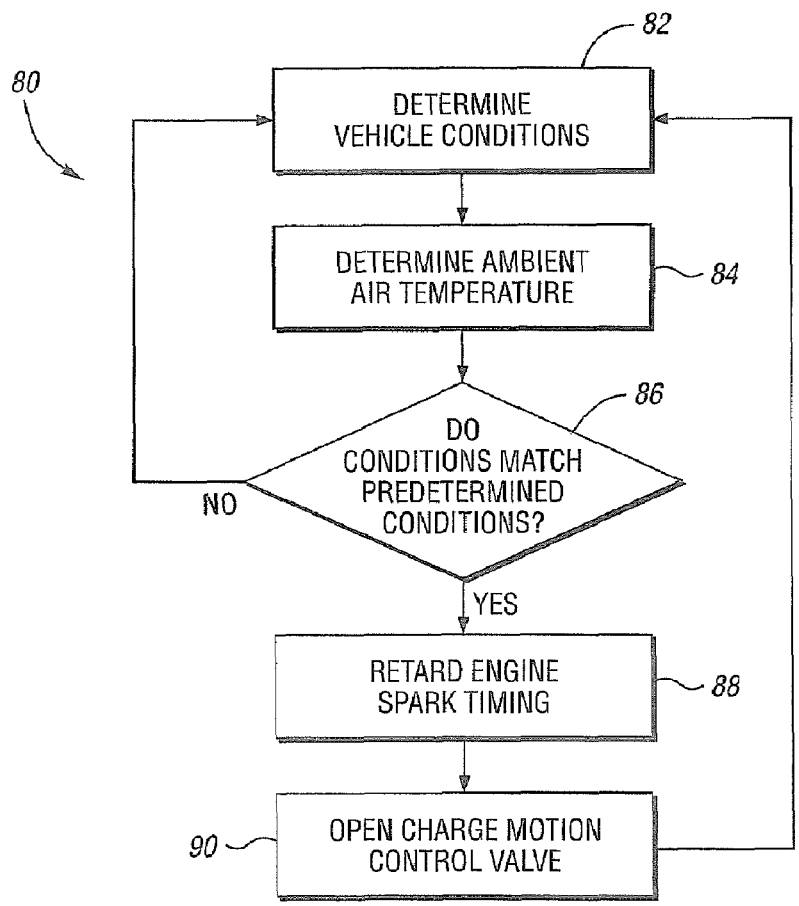
FIG. 3 is a flow chart illustrating a method of the present invention.

FIG. 3 shows a flow chart 80 illustrating one implementation of the present invention. With reference to FIGS. 1 and 2, the control logic for implementing the method illustrated in flow chart 80 is programmed into the VSC/PCM 50. Of course, some or all of the control logic could reside in one or more different controllers, such as an ECU. At step 82, one or more vehicle conditions are determined. For example, the vehicle conditions could include such things as the currently selected transmission gear, the temperature of the catalyst 66, the amount of time since the engine 12 was started, and the temperature of the engine coolant. In addition, at step 84, the temperature of the ambient air outside the vehicle 10 is determined. It is worth noting that although steps 82, 84 are shown chronologically in the flow chart 80, they may occur in any order, including simultaneously.

After steps 82, 84, a decision is made at step 86 to see if the determined conditions match predetermined conditions. The predetermined conditions may be preprogrammed into one or more controllers, such as the VSC/PCM 50. The number and type of conditions that are determined, as well as the predetermined conditions they are compared to, can be modified as desired. For example, the present invention contemplates setting at least one engine parameter to affect an increase in a rate of temperature increase of the engine—e.g., retarding the spark timing of the engine 12. Depending on the level of spark retard, the engine 12 may not operate as smoothly as it does without the spark retard, and therefore, drivability of the vehicle 10 may be affected. Thus, it may be desirable to set one of the vehicle conditions to be a gear selection of a transmission (or, for example, the transaxle 48), and set the predetermined condition to be met when the gear selection is "park". This would ensure that drivability of the vehicle 10 was not affected by retarding the engine spark timing.

Other conditions could be used as entry conditions for that portion of the method which quickly heats the engine 12. For example, the VSC/PCM 50 may receive one or more inputs related to the temperature of the engine coolant. Of course, the temperature of the engine coolant may be measured directly by one or more temperature sensors, or alternatively, could be inferred from other sensed conditions, such as a cylinder head temperature. It may then be desirable to compare the coolant temperature to a predetermined coolant temperature, to see if it is at or below that predetermined temperature. In this way, if the coolant temperature was already hot, there would be no need to implement the remainder of the method, such as adjusting the engine spark timing.

Another condition that could be examined is the temperature of the catalyst 66. As noted above, controlling operation of an engine, such as the engine 12, to quickly heat a catalyst, may be at odds with quickly heating a passenger compartment. Nonetheless, it is still desirable to ensure that a catalyst is quickly heated. Therefore, the present invention contemplates determining the temperature of the catalyst prior to continuing with the method. As with the temperature of the engine coolant, the temperature of the catalyst can be measured directly, or inferred from other parameters, such as the engine speed, load, etc. The temperature of the catalyst 66 can then be compared to a predetermined catalyst temperature, for example, 950° F., to ensure that the catalyst temperature is at or above this temperature.

At step 82, it may also be determined how long the engine 12 has been running. In particular, the time since the engine 12 was started can be compared to a predetermined time period, for example, 90 seconds, to ensure that the engine 12 has been running at least as long as the predetermined time period. This also helps to ensure that the catalyst 66 has been properly heated before the remainder of the method is implemented. Also discussed above, at step 84, the ambient air temperature is determined. This temperature can be compared to a predetermined temperature, for example, 32° F., to ensure that the ambient air temperature is at or below this temperature. This helps to ensure that one or more engine parameters are not unnecessarily adjusted to facilitate increased heat transfer into the passenger compartment 72.

Depending on how the VSC/PCM 50 is programmed, one or more of the aforementioned conditions, or even other conditions not included in the discussion above, may need to be met prior to continuing with the remaining steps of the method. Therefore, if one or more of the conditions examined do not match the predetermined conditions, the method loops back to step 82 where the conditions are again determined, and then again compared to the predetermined conditions at step 86.

If the one or more conditions do match a corresponding predetermined condition, the engine spark timing is retarded at step 88. As noted above, other engine parameters could be adjusted to increase the rate of heat transfer from the engine 12 to the vehicle passenger compartment 72. For example, the amount of fuel injected into the engine 12 could be adjusted, or in the case of a direct injection engine, the timing of the fuel injection could be adjusted. For the embodiment shown in FIG. 3, the engine spark timing is retarded at step 88. As noted above, if the spark timing is retarded too far, much of the combustion will occur at or near the catalyst 66. Therefore, in one embodiment of the present invention, the spark timing is adjusted 1020-1220 behind the point of maximum brake torque. Thus, spark still occurs before TDC. This helps to ensure that combustion will take place in the engine 12, and not at some location in the exhaust system where the heat cannot be utilized by the passenger compartment 72.

In addition to retarding the spark timing at step 88, the charge motion control valve 64 is opened at step 90. Although opening the charge motion control valve 64 allows more air to enter the engine 12, which would normally indicate cooler combustion, the less turbulent flow of the air entering the engine 12 helps to create combustion which is hotter than if the charge motion control valve 64 was closed. This result is directly counter to the general rule that increasing the amount of air entering an engine will reduce the temperature of combustion. Thus, the present invention provides an effective method for quickly heating a passenger compartment even in vehicles having a relatively small engine and relatively low heat output.

Although the steps 88, 90 are shown chronologically in FIG. 3, they can be performed in any order, or even simultaneously. Also shown in FIG. 3, is that after the engine spark timing is retarded and the charge motion control valve 64 is opened, the method loops back to step 82, where conditions are again determined for comparison to predetermined conditions. Although the loop back to step 82 also implies a chronological sequence, the vehicle and/or ambient conditions may be determined on an ongoing basis, for example, at some predetermined interval. In this way, if conditions change even while the engine spark timing is being adjusted, or the charge motion control valve is being opened, the method can be ended. Thus, at any time the appropriate conditions are met, the engine spark timing can be returned to a normal setting, and the charge motion control valve can be repositioned as desired.

While the best mode for carrying out the invention has been described in detail, those familiar with the art to which this invention relates will recognize various alternative designs and embodiments for practicing the invention as defined by the following claims.

What is claimed is:

1. A system for controlling an engine in a vehicle to facilitate heat transfer to a passenger compartment in the vehicle, system comprising:
   a valve for controlling the motion of intake air entering the engine, the valve having a closed position for effecting turbulence in, and restricting the flow of, the intake air entering the engine, the valve further having at least one open position for inhibiting turbulence in, and reducing the restriction of the flow of, the intake air entering the engine; and
   a control system including at least one controller, the control system being configured to:
   determine when at least one predetermined condition is met,
   set at least one engine parameter to effect an increase in a rate of temperature increase of the engine when the at least one predetermined condition is met, thereby facilitating an increase in a rate of heat transfer from the engine to the passenger compartment, and
   move the valve from the closed position to one of the at least one open positions when the at least one predetermined condition is met.

2. The system for controlling an engine of claim 1, wherein the at least one engine parameter is a spark timing of the engine, and the setting of the at least one engine parameter by the control system includes retarding the spark timing of the engine.

3. The system for controlling an engine of claim 1, wherein the control system is further configured to receive an input related to a temperature of ambient air outside the vehicle, and wherein determining when the at least one predetermined condition is met includes determining whether the ambient air temperature is at or below a predetermined ambient air temperature.

4. The system for controlling an engine of claim 1, the vehicle including a transmission, wherein the control system is further configured to receive an input related to a transmission gear selection, and wherein determining when the at least one predetermined condition is met includes determining whether the transmission gear selection is "park".

5. The system for controlling an engine of claim 1, the vehicle including a catalyst for reducing exhaust emissions, wherein the control system is further configured to receive an input related to a temperature of the catalyst, and wherein determining when the at least one predetermined condition is met includes determining whether the temperature of the catalyst is at or above a predetermined catalyst temperature.

6. The system for controlling an engine of claim 1, the vehicle including a coolant for controlling the temperature of the engine, wherein the control system is further configured to receive an input related to a temperature of the coolant, and wherein determining when the at least one predetermined condition is met includes determining whether the temperature of the coolant is at or below a predetermined coolant temperature.

7. The system for controlling an engine of claim 1, wherein the control system is further configured to receive an input related to a time since the engine was started, and wherein determining when the at least one predetermined condition is met includes determining whether the time since the engine was started is at least as long a predetermined time period.

8. A method for controlling an engine in a vehicle to facilitate heat transfer to a passenger compartment in the vehicle, the engine including a valve for controlling the motion of intake air entering the engine, the method comprising:
   setting at least one engine parameter to effect an increase in a rate of temperature increase of the engine when at least one predetermined condition is met, thereby facilitating an increase in a rate of heat transfer from the engine to the passenger compartment; and
   at least partially opening the valve, thereby inhibiting turbulence and increasing the amount of the intake air entering the engine, when the at least one predetermined condition is met.

9. The method of claim 8, wherein setting the at least one engine parameter includes retarding a spark timing of the engine.

10. The method of claim 8, further comprising determining a temperature of ambient air outside the vehicle, and wherein the at least one predetermined condition being met includes the ambient air temperature being at or below a predetermined ambient air temperature.

11. The method of claim 8, the vehicle further including a transmission, a catalyst for reducing exhaust emissions, and a coolant for controlling the temperature of the engine, wherein the at least one vehicle condition is chosen from a set of vehicle conditions including a transmission gear selection, a temperature of the catalyst, a time since the engine was started, and a temperature of the coolant.

12. The method of claim 8, the vehicle further including a transmission, the method further comprising determining a transmission gear selection, and wherein the at least one predetermined condition being met includes the transmission gear selection being "park".

13. The method of claim 8, the vehicle further including a catalyst for reducing exhaust emissions, the method further including determining a temperature of the catalyst, and wherein the at least one predetermined condition being met includes the catalyst temperature being at or above a predetermined catalyst temperature.

14. The method of claim 8, further comprising determining a time since the engine was started, and wherein the at least one predetermined condition being met includes the time since the vehicle was started being at least as long as a predetermined time period.

15. The method of claim 8, the vehicle further including a coolant for controlling the temperature of the engine, the method further comprising determining a temperature of the coolant, and wherein the at least one predetermined condition being met includes the coolant temperature at or being below a predetermined coolant temperature.

16. A method for controlling an engine in a vehicle to facilitate heat transfer to a passenger compartment in the vehicle, the engine including a valve for controlling the motion of intake air entering the engine, the method comprising:

retarding a spark timing of the engine when at least one predetermined condition is met, the at least one predetermined condition including at least one vehicle condition; and at least partially opening the valve, thereby inhibiting turbulence and increasing the amount of the intake air entering the engine, when the at least one predetermined condition is met.

17. The method of claim 16, the vehicle further including a transmission, the method further comprising determining a transmission gear selection, and wherein the at least one vehicle condition includes the transmission gear selection, and the at least one predetermined condition being met includes the transmission gear selection being "park".

18. The method of claim 16, the vehicle further including a catalyst for reducing exhaust emissions, the method further comprising determining a temperature of the catalyst, and wherein the at least one vehicle condition includes the catalyst temperature, and the at least one predetermined condition being met includes the catalyst temperature being at or above a predetermined catalyst temperature.

19. The method of claim 16, further comprising determining a time since the engine was started, and wherein the at least one vehicle condition includes the time since the engine was started, and the at least one predetermined condition being met includes the time since the vehicle was started being at least as long as a predetermined time period.

20. The method of claim 16, the vehicle further including a coolant for controlling the temperature of the engine, the method further comprising determining a temperature of the coolant, and wherein the at least one vehicle condition includes the coolant temperature, and the at least one predetermined condition being met includes the coolant temperature being at or below a predetermined coolant temperature.

21. The method of claim 16, further comprising determining a temperature of ambient air outside the vehicle, and wherein the at least one predetermined condition being met includes the ambient air temperature being at or below a predetermined ambient air temperature.

* * * * *